United States Patent Office 3,787,525
Patented Jan. 22, 1974

3,787,525
MANUFACTURE OF POLYURETHANE POWDERS USING POLYVINYL PYRROLIDONE HAVING SIDE CHAINS FROM COPOLYMERIZATION WITH ALKYLATED OLEFINS
John J. McGarr, Beverly, Mass., assignor to USM Corporation, Boston, Mass.
No Drawing. Filed Aug. 7, 1972, Ser. No. 278,611
Int. Cl. C08g 41/04
U.S. Cl. 260—859 R           10 Claims

ABSTRACT OF THE DISCLOSURE

Method for preparing polyurethane resins directly in finely divided form by reaction in an inert organic liquid medium of a first reactant, miscible with the organic liquid medium, and a second reactant immiscible and emulsified as fine droplets in a continuous phase of the liquid medium with the aid of special surfactants. The reaction forms a finely divided reaction product insoluble in the liquid medium.

BACKGROUND OF THE INVENTION

The demand for thermoplastic resin powders is large and steadily growing for such uses as coatings and adhesives, particularly in view of the increasing strictness of regulations regarding discharge of solvent materials into the atmosphere. In general, resin powders have been prepared by processes of grinding already formed resinous material or by dissolving already formed resinous material and precipitating the resinous material from solution. However, by the very fact that the resinous materials to be ground are thermoplastic and often tough materials, relatively costly procedures involving chilling of the resin, for example with liquid nitrogen, have been necessary for effective grinding. In addition to the cost of the refrigerant and of the grinding equipment, sophisticated collecting equipment has been necessary because of the substantial proportion of dust formed in the grinding process.

Solution and precipitation procedures for forming powders have been costly because of the time involved in dissolving the resin and the precipitation which is usually effected by adding to the resin solution an organic liquid miscible with the solvent but incapable of dissolving the resin. This procedure thus involves not only solvent recovery and separation of mixed organic liquids, but also the drying of the precipitated resin with the problems of avoiding escape of organic liquid material. It has been proposed to form resin latices and produce powder by coagulation of the latices; but this process is limited in the character of material to which it is applicable.

Also, it is known that polyurethanes can be prepared by the interfacial polymerization of polyisocyanates with compounds containing hydroxyl groups when the reaction is conducted in an inert liquid medium where one of the reactants is immiscible in the medium and the other is soluble. However, efforts to make very fine particles of a uniform size below 100 microns have not been successful.

BRIEF SUMMARY OF THE INVENTION

It is an object of the present invention to manufacture a very fine resin powder directly, that is, without grinding and without the use of a solvent for the resinous material.

BRIEF STATEMENT OF THE INVENTION

To this end and in accordance with a feature of the present invention materials, liquid under reaction conditions and reactive to form solid polyurethane resins are introduced into an organic liquid medium which is inert to the reactive materials and in which one of the reactive materials is miscible and another material reactive with the miscible material is immiscible and insoluble and is emulsified as fine droplets with the aid of special surfactants. Reaction occurs between the droplets of the emulsified immiscible material and the miscible reactive material present in the organic liquid medium to form finely divided particles of polyurethane. The particles of reaction product are insoluble in and will separate from the liquid medium.

DETAILED DESCRIPTION OF THE INVENTION

Polyurethane is made directly in very finely divided form by reaction between a first and second reactant in an organic inert liquid medium inert to the reactants. One of the reactants is miscible in the organic liquid medium and the other reactant is immiscible and is emulsified as fine droplets in a continuous phase of the liquid medium with the aid of special surfactants. Reaction between the immiscible reactant of the droplets and the miscible reactant in the liquid medium takes place at the surface of the droplets which constitutes an interface between the reactants. The new product from chemical combination and polymerization of the reactants remains in dispersed form as solid particles insoluble in the organic liquid vehicle and may be separated as powder.

The reaction mixture may be formed by introducing the two reactants into the organic liquid medium separately under conditions which emulsify the liquid immiscible reactant and mix the miscible reactant through the liquid medium, or by separately emulsifying the immiscible reactant in a portion of organic liquid medium and adding the emulsion to a body of organic liquid medium containing the miscible organic reactant, or by emulsifying the immiscible reactant in the organic liquid medium and adding miscible liquid reactant to the emulsion.

The method of the present invention has been found particularly useful in the manufacture of polyurethane powder by reacting at least one organic compound of which at least two groups per molecule contain active hydrogen atoms which are reactive with —NCO groups, and at least one organic compound having at least two —NCO groups per molecule.

Organic liquids for use as the continuous phase of the emulsion may be any liquid not reactive with the reactants, e.g., not reactive with —NCO or with active hydrogens where the product is to be a polyurethane, and in which at least one of the reactants and the reaction product are immiscible and insoluble and other of the reactants are miscible. It is ordinarily desired that such liquids be volatile for removal from the reaction product by evaporation at temperatures which will not harm the product; and that the boiling point be above the desired reaction temperature. Liquids with lower boiling points may be used but may require the use of pressure vessels to allow operation at the desired temperature. Liquids which are high boiling or otherwise difficult to separate from the reaction product may be removed by washing or removing by solvent extraction with liquids which do not harm the reaction product and which are more readily removed. Organic liquids having a boiling point or boiling range, preferably between about 65° C. and about 200° C. such as hydrocarbons, halogenated hydrocarbons, ethers . . . may be used. Hydrocarbon liquids, preferably aliphatic hydrocarbon liquids, such as petroleum fractions, have been found desirable because of their low cost, inertness to the reactants and ease and completeness of removal from the reaction product.

Any organic compound or mixture of compounds having at least two —NCO group may be used in the method to form polyurethanes. Polyisocyanates adapted for use include cyclohexylene-1,4-diisocyanate, 2,4-tolylene diisocyanate, 2,6-tolylene diisocyanate, 4,4'-diphenylmethane diisocyante, 3,3'-dimethyldiphenylmethane-4,4'-diisocyanate, and 4,4'-dicyclohexylmethane diisocyanate, p-phenylene diisocyanate, m-phenylene diisocyanate, xylylene diisocyanate, 1,4-naphthylene diisocyanate, diphenyl-4,4'-diisocyanate and hexamethylene diisocyanate.

Any organic compound or mixture of compounds having at least two groups per molecule containing active hydrogens and which is a liquid under reaction conditions may be employed as the second reactant in the method. Suitable compounds include polyols such as 1,4-butanediol, 1.5-pentanediol, 1,6-hexanediol, diethylene glycol, p-phenylene-di-beta-hydroxy-ethyl ether, trimethylol propane, glycerol, alkanolamines such as diethanolamine, diamines, such as ethylene diamine, hexamethylene diamine and 4,4'-diaminodiphenyl methane, hydroxyl terminated polyesters from reaction and polymerization of organic compounds having at least two hydroxyl groups such as glycol, polypropylene glycol, hexanediol, bis - (hydroxymethyl cyclohexane), 1,4 - butanediol, diethylene glycol, polyethylene glycol and mixtures of these and organic compounds having at least two carboxyl groups such as adipic acid, succinic acid, sebacic acid, azelaic acid and mixtures of these, polyesteramides, polyhydric polyalkylene ethers, polyhydric polythioethers, polypropylene glycol, polybutylene glycol, polyalkylene ether glycols from condensation of an alkylene oxide such as ethylene oxide, propylene oxide and butylene oxide with a compound containing active hydrogens such as water, ethylene glycol and propylene glycol, polytetramethylene ether glycols and mixtures of these.

The compound or compounds having reactive —NCO groups and the compound or compounds having groups containing active hydrogens are employed in relative proportions giving a molar ratio of active hydrogen to —NCO in the range of from about 0.85:1 to about 1.15:1. Where a thermoplastic resin is desired, the ratio should be from about 0.95:1 to about 1.15:1.

Use of a surfactant effective to aid in forming and maintaining an emulsion of very fine droplets of the immiscible reactant is of primary importance in the operation of the method to form very fine powders. Although little has been published on the preparation of nonaqueous emulsions, many of the principles which have evolved in the study of aqueous emulsions are valid. It has long been recognized that the suitability of emulsifying agents can be determined at least partly on the basis of their so-called hydrophile-lipophile balance numbers. Becher ("Emulsions, Theory and Practice," 2nd ed., p. 233, Reinhold Publishing Corporation, New York) states that surfactants suitable for making water-in-oil emulsions are generally in the HLB range 3-6, while those suitable for making oil-in-water emulsions are generally in the HLB range 8-18. The well-known Rule of Bancroft states that the external phase of an emulsion will be that in which the emulsifying agent is the more soluble. The factor of balance is important because if the disparity in solubility is too great—if the solubility is very high in one phase and very low in the other—no emulson at all will be formed.

The necessity of balance in nonaqueous systems is illustrated by the fact that stable dispersions of organic solids in organic liquids can be made using copolymers as surface active stabilizers (British Pat. to Osmond 1,052,241, publshed Dec. 21, 1966). In such cases one part of the copolymer is solvated by the organic liquid and the other part becomes associated with the dispersed solid. The copolymer must have an appreciable molecular weight to be effective, suitably at least 1000.

On the basis of the foregoing discussion, it is clear that an emulsion of fine droplets of an immiscible liquid reactant for the production of finely divided polyurethane particles can be prepared using a copolymer surfactant one part of which is solvated by the inert liquid reaction medium and the other part of which is associated with the reactant droplets. For example, in order to emulsify 1,4-butane diol in heptane, one would choose as surfactant a copolymer made from two types of monomer, (a) one like vinyl pyrolidone, vinyl alcohol, acrylamide, etc., which, if homopolymerized, would be highly compatible with 1,4-butanediol, and (b) one like vinyl stearate, lauryl methacrylate, long chain alpha-olefin etc., which, if homopolymerized, would be highly compatible with heptane. Furthermore, the molecular weight of the copolymer and the mole ratio of its monomeric constituents would be such that it would be somewhat more solvated by the heptane than by the 1,4-butane diol so that the heptane would be the external phase.

For emulsifying the immiscible liquid reactant in the present method, the products of copolymerizing vinyl pyrrolidone with an alkylated olefin to give copolymers having alkyl side chains of from 4 to 20 carbon atoms, the proportion of alkylated olefin being in the range of from about 10% to about 80% with molecular weight of at least 1,000 and preferably above 4000, have been found to be particularly effective surfactants. The quantity of surfactant used will depend on a variety of factors including the physical properties of the reactants and of the inert liquid medium, the time required for the reaction, the efficiency of the emulsifying equipment, the size of reaction product particle desired and so on. In general, from about 0.5% to about 10% of surfactant based on the weight of the —NCO terminated reactant will be used.

There must be some specificity to the surfactant according to the nature of the immiscible reactant chosen to produce the polyurethane. For example, in order to emulsify polytetramethylene ether glycol in heptane one would require a surfactant with a polarity balance different from that required to emulsify polybutylene adipate; since the former is less polar than the latter, the mole ratio of the polar moiety of the required surfactant would be less.

However, the requirement for specificity does not demand the synthesis of a new surfactant for each case. It is well known that in emulsifying oils of various HLB requirements in water one can produce such emulsions with blends of various composition of just two surfactants, one polar and the other nonpolar. For example, using Span 20 with an HLB of 8.6 and Tween 20 with an HLB of 16.7, one can make blends of these surfactants that will produce oil-in-water emulsions of both mineral oil with an HLB requirement of 10 and benzene with an HLB requirement of 15.

A parallel situation exists in making emulsions of one organic liquid in another organic liquid. For example, using two copolymers of vinyl pyrrolidone and octadecene-1, one containing 0.2 mole ratio of vinyl pyrollidone and the other 0.8 mole ratio, one can emulsify in heptane hydroxy terminated polyethers and polyesters of different polarity.

Catalysts are ordinarily employed to improve the rate and completeness of reaction. Any of a variety of known catalysts can be used including dibutyl tin dilaurate, stannous octoate, tertiary amines such as N-methylmorpholine and triethyl amine, mercury catalysts such as phenyl mercuric propionate, lead naphthenate, lead octoate and others. Very small amounts only sufficient to provide catalytic action are used and it is preferred that the amount be from about 0.01% to about 1% by weight based on the weight of the reactants.

Any of the well-known emulsating equipment can be used to disperse the reactive materials. Thus, high speed agitating devices as well as homogenizers in which an emulsion is formed by forcing the materials through narraw openings, have been found effective. These devices are used in accordance with procedures known to those skilled in the art. However, it is preferred to disperse the compound having groups with active hydrogen in the inert liquid medium containing the surfactant to form a creamy emulsion and thereafter to add the organic compound having —NCO groups and the catalyst. The relative proportions of reactants to inert liquid medium does not appear to be critical and emulsions have been made with as much as 50% by weight of the reactive materials based on the weight of the final emulsion.

In emulsifying liquid reactants it is preferred to operate under conditions giving a droplet size of from 5 to 100 microns, most preferably from 5 to 15 microns. The droplet size is controlled by the severity of agitating or homogenizing action and by the effectiveness of the surface active agent.

The time required for reaction to form solid polyurethane varies with the temperature, the efficiency of the catalyst and the reactivity of the components of the droplets. Reaction times may be from as little as 15 seconds for aliphatic amine-aromatic —NCO reaction to as much as 2 hours for hydroxyl-aliphatic —NCO. Since effective operation of the process to form fine particles depends on maintaining the reactive materials in suspension, the shorter reaction times are preferred.

Carrying out the reaction through dispersion of reactive materials in an inert solvent offers a number of advantages in addition to that of forming fine particle size reaction product directly. That is, good temperature control is achieved since the reaction takes place in a well-agitated liquid and in addition the relative proportions of the reactants are more uniform throughout the reaction system because of the dispersion of the reactive materials so that localized excessive concentrations of one or the other reactive materials are avoided.

Because of the fine, uniform solidified condition of the reaction product, it is readily separated from the inert liquid medium by such known procedures as filtration, centrifugation and decantation. Conventional equipment for performing these operations may be used.

After separation of the finely divided reaction product, the product is normally washed with an inert organic liquid. This washing may be needed to remove the inert liquid forming the continuous phase of the reaction emulsion where the reaction liquid is relatively non-volatile or otherwise difficult to remove. However, in any case, it is desirable to wash the reaction product in order to remove surfactant which may remain in the product after separation from the continuous phase.

Following the washing step, the reaction product is dried. It has been found useful with some reaction materials to incorporate a finely divided solid material such as talc, silica or pigment to reduce a possible tendency of the particles to become agglomerated. This solid material may be introduced at any convenient stage either before separation of the finely divided reaction product from the inert liquid continuous phase or by suspending the reactive particles in a wash liquid along with the finely divided inorganic material or by admixture or stirring into the fine particles of reaction product either before or after drying.

Drying of the particles of reaction product may be effected in any suitable manner such as on trays or drying screens or by procedure comparable to fluid bed drying in which a slurry of the fine particles of reaction product is suspended in contact with a warm or hot gas. In a drying operation comparable to fluid bed drying, a dusting material to prevent agglomeration of the particles may be included in the gaseous medium for drying the finely divided product.

The following examples are given to aid in understanding the invention but it is to be understood that the invention is not limited to the particular materials, temperatures, procedures and other conditions set forth in the examples.

EXAMPLE I 634 gm. (1.268 eq.) of —OH terminated polybutylene adipate, mol wt. 1,000 and 57.2 gm. (1.268 eq.) of 1,4-butanediol dispersed in 1500 gm. of a liquid paraffinic hydrocarbon mixture (boiling range 174° C. to 207° C.) containing 28 gm. of a mixture of molecules of the copolymer of vinyl pyrrolidone and octadecene-1 having an average molecular weight of 8400 and a mole ratio of vinyl pyrollidone to octadecene-1 of 1:1. While this mixture was being agitated vigorously at 65° C., there was added 317.9 gm. (2.54 eq.) of 4,4'-diphenyl methane diisocyanate and 1 gm. of dibutyl tin dilaurate. After ¾ hour agitation, the mixture was filtered and the fine powdered product having particle size less than 75 microns rinsed with heptane and air dried.

A film prepared from this product on a 165° C. hydraulic press had the following tensile properties:

| | |
|---|---|
| 100% modulus | p.s.i. 1000 |
| Tensile strength | p.s.i. 8600 |
| Elongation at break | percent 670 |

EXAMPLE II 633 gm. (1.266 eq.) of polybutylene adipate, mol wt. 1000, and 57.0 gm. (1.266 eq.) of 1,4-butanediol were dispersed in a surfactant solution identical to that of Example I. While this mixture was being agitated vigorously at 65° C., there was added 334 gm. (2.53 eq.) of 4,4'-dicyclohexyl methane diisocyanate and 5 gm. of dibutyl tin dilaurate. After two hours agitation, the mixture was filtered and the fine powdered product of which the particles were less than 75 microns was rinsed with heptane and air dried.

A film prepared from this product on 150° C. hydraulic press had the following tensile properties:

| | |
|---|---|
| 100% modulus | p.s.i. 850 |
| Tensile strength | p.s.i. 7300 |
| Elongation at break | percent 560 |

EXAMPLE III 87.5 gm. (.175 eq.) of polybutylene adipate, mol wt. 1000, and 23.7 gm. (.525 eq.) of 1,4-butanediol were dispersed in 300 gm. of the hydrocarbon liquid of Example I containing 5.6 gm. of a mixture of molecules of the copolymer of vinyl pyrollidone and octadecene-1 having an average molecular weight of 8400 and a mole ratio of vinyl pyrrolidone to octadecene-1 of 1:1. While this mixture was being agitated vigorously at 65° C., there was added 87.5 gm. (.700 eq.) of 4,4'-diphenyl methane diisocyanate and 0.2 gm. dibutyl tin dilaurate. After ¾ hour agitation, the mixture was filtered and the fine powder of which the particles were all less than 75 microns was rinsed with heptane and air dried.

A film prepared from this product on a 185° C. hydraulic press had the following tensile properties:

| | |
|---|---|
| 100% modulus | p.s.i. 2800 |
| Tensile strength | p.s.i. 7700 |
| Elongation at break | percent 425 |

EXAMPLE IV

Example III was repeated without the presence of the surfactants. The dispersion of diols was very poor and there was a deposit of polyester on the walls of the glass vessel. Thirty seconds after the addition of catalyst, it became impossible to agitate the gummy product, which consisted of a single, large lump.

EXAMPLE V 100.2 gm. (.2004 eq.) of polybutylene adipate, mol wt. 1000, and 27.1 gm. (.601 eq.) of 1,4-butanediol were dispersed in a surfactant solution identical to that of Example III. While this mixture was being agitated vigorously at 65° C., there was added 1 gm. of dibutyl tin dilaurate and then, over a period of about five minutes, 67.3 gm. (.773 eq.) of an isomeric mixture of 80% 2,4- and 20% 2,6-tolylene diisocyanate. After ¾ hour agitation, the mixture was filtered and the fine powder rinsed with heptane and air dried.

A film prepared from this product on a 150° C. hydraulic press had the following tensile properties:

100% modulus _____ p.s.i__ 220
Tensile strength _____ p.s.i__ 2000
Elongation at break _____ percent__ 900

EXAMPLE VI 616 gm. (1.232 eq.) of polytetramethylene ether glycol and 55.5 gm. (1.232 eq.) of 1,4 butanediol were dispersed in 1400 gm. of heptane containing 28 gm. of a mixture of molecules of a copolymer of vinyl pyrrolidone and octadecene-1 having an average molecular weight of 7300 and a mol ratio of vinyl pyrrolidone to octadecene-1 of 1:4. While this mixture was being agitated vigorously at 24° C., there was added 5 gm. of dibutyl tin dilaurate and then, over a period of about 30 minutes, 305 gm. (2.44 eq.) of 4,4'-diphenylmethane diisocyanate. The mixture was agitated for another ¾ hour. The slurry was filtered and the fine powder of which all particles were less than 20 microns was rinsed with heptane and air dried.

A film prepared from this product on a 150° C. hydraulic press had the following tensile properties:

100% modulus _____ p.s.i__ 760
Tensile strength _____ p.s.i__ 7000
Elongation at break _____ percent__ 800

Having thus described my invention what I claim as new and desire to secure as Letters Patent of the United States is as follows:

1. The method for preparing polyurethane resins directly in finely divided form from reaction of a first reactant comprising at least one organic polyisocyanate with a second reactant comprising at least one organic compound containing at least two groups having active hydrogen, said first reactant being employed in amount relative to the amount of said second reactant to give a molar ratio of active hydrogen to —NCO in the range of from about 0.85:1 to about 1.15:1, said method comprising the steps of emulsifying, with the aid of a surfactant in amount of from about 0.5% to about 10% by weight based on the weight of said polyisocyanate, one of said reactants as droplets in a continuous phase comprising an organic liquid inert to said reactants and in which said one reactant is immiscible and the other is miscible, said surfactant having a molecular weight of at least about 1000 average molecular weight and comprising at least one polyvinyl pyrrolidone having alkyl side chains from copolymerization of alkylated olefins with vinyl pyrrolidone, said alkyl chains having from 4 to 20 carbon atoms and the proportion of alkylated olefin in said copolymer being in the range of from about 10% to about 80%, the mole ratio of monomers being such that the solvation of the molecules of surfactant in the organic liquid medium is greater than the solvation of the surfactant in the immiscible reactant by an amount to form a fine emulsion of dispersed droplets of the immiscible reactant in the reaction medium, introducing said other reactant into said organic liquid, reacting said reactants at the interface between the droplets of the emulsified reactant and the continuous phase containing said miscible reactant under conditions of vigorous agitation to form fine particles of solid polyurethane plastic.

2. The method for preparing polyurethane resins directly in finely divided form as defined in claim 1 in which said emulsified immiscible reactant is said compound containing groups having active hydrogen.

3. The method for preparing polyurethane resins directly in finely divided form as defined in claim 2 in which said compound containing groups having active hydrogen includes at least one —OH terminated polyester having a molecular weight of from about 300 to about 4000.

4. The method for preparing polyurethane resins directly in finely divided form as defined in claim 3 in which said compound containing active hydrogen includes at least one —OH terminated polyalkylene ether polyol having a molecular weight of from 300 to about 4000.

5. The method for preparing polyurethane resins directly in finely divided form as defined in claim 2 in which said miscible reactant is a member of the group consisting of aromatic and cycloaliphatic diisocyanates.

6. The method for preparing thermoplastic polyurethane resins directly in finely divided form as defined in claim 5 in which the ratio of active hydrogen to —NCO is from about 0.95:1 to about 1.15:1.

7. The method for preparing polyurethane resins directly in finely divided form as defined in claim 5 in which said diisocyanate is added to an already formed emulsion of said immiscible reactant under conditions of vigorous agitation.

8. The method for preparing polyurethane resins as defined in claim 3 in which said inert organic liquid is a liquid paraffinic hydrocarbon and said surfactant is a mixture of copolymer of vinyl pyrrolidone and octadecene-1 having an average molecular weight above about 4000 and an average mole ratio of vinyl pyrrolidone of octadecene-1 to 1:1.

9. The method for preparing polyurethane resins as defined in claim 4 in which said inert organic liquid is a liquid paraffinic hydrocarbon and said surfactant is a mixture of copolymers of vinyl pyrrolidone and octadecene-1 having a molecular weight above about 4000 and an average mole ratio of vinyl pyrrolidone to octadecene-1 of 1:4.

10. The method for preparing polyurethane resins as defined in claim 1 in which said surfactant has a molecular weight above about 4000 and said inert organic liquid is an aliphatic hydrocarbon.

References Cited

UNITED STATES PATENTS

| | | | |
|---|---|---|---|
| 3,317,635 | 5/1967 | Osmond | 260—859 R |
| 3,382,297 | 5/1968 | Thompson | 260—859 R |
| 3,700,752 | 10/1972 | Hutchinson | 260—859 R |
| 3,716,505 | 2/1973 | Ohe | 260—859 R |

PAUL LIEBERMAN, Primary Examiner

U.S. Cl. X.R.

260—34.2, 37 N, 41 A, 77.5 CR